(12) United States Patent
Goriki et al.

(10) Patent No.: US 8,093,837 B2
(45) Date of Patent: Jan. 10, 2012

(54) LAMP BALLAST AND AN ILLUMINATION APPARATUS

(75) Inventors: Takeshi Goriki, Yawata (JP); Akira Yufuku, Himeji (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 261 days.

(21) Appl. No.: 12/596,890

(22) PCT Filed: Apr. 16, 2008

(86) PCT No.: PCT/JP2008/057435
§ 371 (c)(1),
(2), (4) Date: Oct. 21, 2009

(87) PCT Pub. No.: WO2008/133143
PCT Pub. Date: Nov. 6, 2008

(65) Prior Publication Data
US 2010/0117547 A1    May 13, 2010

(30) Foreign Application Priority Data
Apr. 24, 2007    (JP) ................................. 2007-114695

(51) Int. Cl.
*G05F 1/00* (2006.01)
(52) U.S. Cl. ........ 315/307; 315/291; 315/247; 315/224; 315/274
(58) Field of Classification Search .................. 315/247, 315/246, 185 S, 224, 225, 209 R, 291, 307, 315/308–311, 312, 326, 274, 278
See application file for complete search history.

(56) References Cited

U.S. PATENT DOCUMENTS

| | | | |
|---|---|---|---|
| 7,368,881 B2 * | 5/2008 | Suganuma et al. | 315/291 |
| 7,378,804 B2 * | 5/2008 | Mitsuyasu et al. | 315/247 |
| 2007/0164689 A1 * | 7/2007 | Suzuki | 315/291 |

FOREIGN PATENT DOCUMENTS

| | | |
|---|---|---|
| JP | 4-253182 A | 9/1992 |
| JP | 2002-352970 A | 12/2002 |
| JP | 2003-217888 A | 7/2003 |

OTHER PUBLICATIONS

International Search Report for the Application No. PCT/JP2008/057435 mailed Jul. 22, 2008.

* cited by examiner

*Primary Examiner* — Tuyet Thi Vo
(74) *Attorney, Agent, or Firm* — Cheng Law Group, PLLC

(57) ABSTRACT

A lamp ballast capable of lighting a discharge lamp and an incandescent lamp each at an optimum condition. The lamp ballast has a DC-DC converter, an inverter that converts an output of DC-DC converter into an AC power for applying the same to a lamp load, a starting circuit generating a high voltage pulse from the AC power to provide the same to the lamp load, and a controller that controls the DC-DC converter and the inverter to provide a variable DC voltage and the AC power of variable frequency. The controller has a starting mode of operating the inverter at a starting frequency to generate the high voltage, and a lighting mode of operating the inverter at a lighting frequency lower than the starting frequency. The controller has a detection mode of causing the DC-DC converter to output a detection voltage of a predetermined level prior to the starting mode, a discharge lamp lighting program of operating, after the detection mode, the inverter in the starting mode and subsequently in the lighting mode, and an incandescent lamp lighting program of operating, after the detection mode, the inverter in the lighting mode without through the starting mode. When the detection voltage exceeds a predetermined threshold, the controller selects the discharge lamp lighting program, and otherwise selects the incandescent lamp lighting program. When the incandescent lamp is connected, the ballast turns on the incandescent lamp without applying a high voltage pulse so as to avoid lowering of the lamp life.

5 Claims, 4 Drawing Sheets

(A)

Detection mode (DM) | Starting mode (SM) | Lighting mode (LM)

(B)

Detection mode (DM) | Lighting mode (LM)

(A)

(B)

LAMP BALLAST AND AN ILLUMINATION APPARATUS

TECHNICAL FIELD

The present invention is directed to a lamp ballast capable of selectively operating a discharge lamp such as a high intensity discharge lamp and an incandescent lamp such as a halogen lamp, and an illumination apparatus employing the lamp ballast.

BACKGROUND ART

Japanese Patent Publication JP2002-352970 A discloses a lamp ballast for a high intensity discharge lamp which includes a lamp discriminating means so as not to supply an excessive power upon being accidentally connected to an incandescent lamp such as a halogen lamp. The lamp ballast includes a DC-DC converter providing a variable DC voltage, an inverter converting the output voltage from the DC-DC converter into the AC power to be applied to a lamp load, a starting circuit for generating a high voltage pulse out of the output voltage from the inverter and applying the high voltage pulse to the lamp load, and a control circuit for varying the output voltage from the DC-DC converter. The lamp discriminating means is configured to cause the DC-DC converter to generate a low detection voltage before generating the high voltage pulse, determine whether the lamp load is the discharge lamp or the incandescent lamp based on the detection voltage, and output thus determined result to the control circuit. When the result identifies the discharge lamp, the control circuit operates the DC-DC converter to increase its output up to a normal voltage, thereby allowing the inverter and the starting circuit to generate the high voltage pulse for starting the discharge lamp, and subsequently controlling the inverter to provide the AC power for lighting the discharge lamp. When, on the other hand, the incandescent lamp is identified, the control circuit causes the DC-DC converter to lower its output voltage from the normal voltage, thereby avoiding an excessive power from being supplied to the incandescent lamp.

However, the starting circuit is also activated under a condition where the incandescent lamp is connected to the lamp ballast, and then applies the high voltage pulse to the incandescent lamp. This causes the incandescent lamp to suffer from an undue electric stress. The undue electric stress shortens a life of the incandescent lamp.

DISCLOSURE OF THE INVENTION

In view of the above problem, the present invention has been accomplished to provide a lamp ballast which is capable of supplying to a connected lamp load a proper electric power corresponding to it whether the lamp load is a discharge lamp or an incandescent lamp, and which is capable of turning on the connected incandescent lamp without applying a high voltage pulse thereto.

The lamp ballast according to the present invention involves a DC-DC converter, an inverter, a starting circuit, a controller, and a comparator. The DC-DC converter is configured to convert a DC voltage into a variable DC voltage and output the same. The inverter is configured to convert the DC voltage from the DC-DC converter at a varying frequency into an AC power, and to provide the AC power to a lamp load. The starting circuit is configured to receive the AC power to generate a high voltage pulse and provide it to the lamp load. The controller is configured to control the DC-DC converter and the inverter to provide the variable DC voltage and the AC power of variable frequency. The comparator is configured to compare the DC voltage from the DC-DC converter with a predetermined threshold. The controller has a starting mode of driving the inverter at a starting frequency to generate the high voltage pulse, and a lighting mode of driving the inverter at a frequency lower than the starting frequency. The controller further has a detection mode of causing the DC-DC converter to provide a detection DC voltage prior to the starting mode. Moreover, the controller has a discharge lamp lighting program of operating, after the detection mode, the inverter in the starting mode and subsequently in the lighting mode, and an incandescent lamp lighting program of operating, after the detection mode, the inverter in the lighting mode without through the starting mode. The comparator is configured to provide a first diction signal to the controller when the detection DC voltage exceeds the predetermined threshold, and provide a second detection signal when the detection DC voltage is lower than the predetermined threshold. The controller is configured to select the discharge lamp lighting program in response to the first detection signal, and select the incandescent lamp lighting program in response to the second detection signal.

As mentioned above, the lamp ballast is able to supply to the connected lamp load a proper electric power corresponding to it, because the controller executes the discharge lamp lighting program when the discharge lamp is connected, and executes the incandescent lamp lighting program when the incandescent lamp is connected. Especially, in the case of a connection of the incandescent lamp, the lamp ballast turns on the incandescent lamp at a predetermined electric power without applying a high voltage pulse thereto. This makes it possible to prevent a life of the incandescent lamp from being shortened.

Preferably, the inverter includes a resonant circuit configured to oscillate at the starting frequency for generating the high voltage pulse. It is capable of generating the high voltage pulse that the controller selects the discharge lamp lighting program and operates the inverter at the starting frequency. Therefore, the lamp ballast needs no other active circuits to turn on the discharge lamp.

Alternatively, the controller may be configured to monitor the current and the voltage output from the DC-DC converter, and have a first current control table defining a characteristic curve showing a relation between the current and the voltage output from the DC-DC converter, and a second current control table defining another characteristic curve different from that of the first current control table with regard to a relation between the current and the voltage output. In this instance, the controller is configured to control the current output from the DC-DC converter on the basis of the first current control table upon selection of the discharge lamp lighting program, and to control the current output from the DC-DC converter on the basis of the second current control table upon selection of the incandescent lamp lighting program. Accordingly, whether the lamp ballast is connected to the discharge lamp or the incandescent lamp, the lamp ballast is capable of executing a proper power control corresponding to a lamp characteristic thereof.

Further, the controller is configured to delimit the output current from the DC-DC converter below a predetermined level during a certain initial period in the lighting mode when the incandescent lamp lighting program is selected. This makes it possible to prevent an inrush current from flowing through the incandescent lamp around the time when the incandescent lamp begins to light. Thus, the lamp ballast is able to extend the life of the incandescent lamp.

DESCRIPTION OF THE PREFERRED EMBODIMENTS

Figure 1:
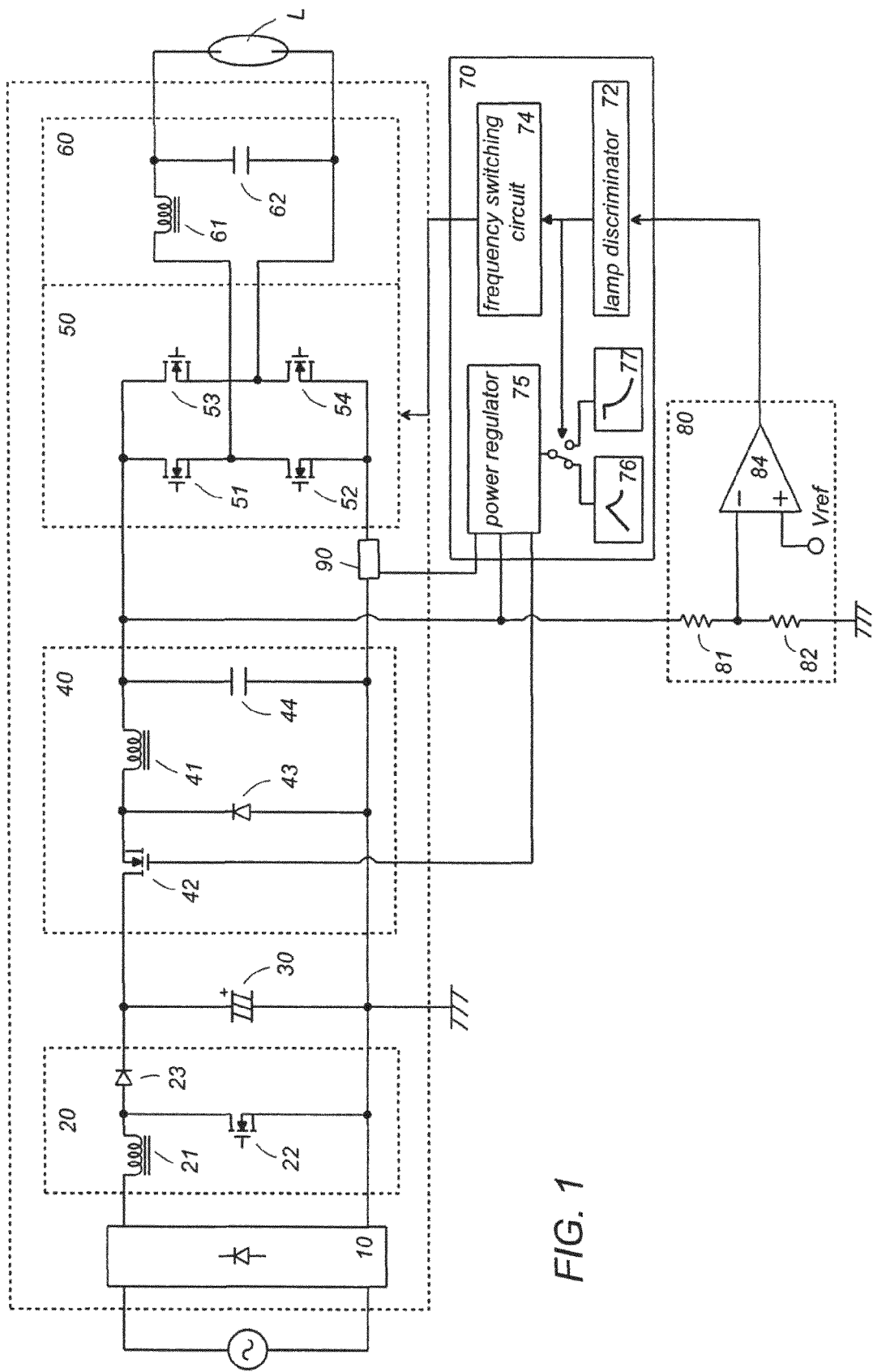
FIG. 1 is a circuit diagram illustrating a lamp ballast in accordance with a preferred embodiment of the present invention.

Referring to attached drawings, a lamp ballast in accordance with a preferred embodiment of the present invention is explained. The lamp ballast is designed to turn on a discharge lamp such as a high intensity discharge lamp, and an incandescent lamp such as a halogen lamp. As shown in FIG. 1, the lamp ballast includes a diode bridge 10 for full-wave rectification of an AC power source, a smoothing capacitor 30 connected across the diode bridge 10 through a power factor correction (power factor improvement) circuit 20, a DC-DC converter 40 configured to output a DC voltage by use of the smoothing capacitor 30 as a power source, a inverter 50 configured to convert the DC voltage output from the DC-DC converter 40 into an AC power, and a controller 70 configured to control the DC-DC converter 40 and the inverter 50. The power factor correction circuit 20 configures a boost converter (a step-up chopper) having an inductor 21, a switching device 22, and a diode 23. The inductor 21 and the switching device 22 are connected in series between outputs of the diode bridge 10. The diode 23 is connected between the smoothing capacitor 30 and the inductor 21. The power factor correction circuit 20 develops a boosted DC voltage across the smoothing capacitor 30.

The DC-DC convertor 40 configures a step-down chopper having a switching device 42, a diode 43, an inductor 41, and a capacitor 44. A series circuit of the switching device 42 and the diode 43 is connected across the smoothing capacitor 30. The inductor 41 and the capacitor 44 are connected in series across the diode 43. The DC-DC converter 40 varies an output DC voltage developed across the capacitor 44 in response to a variation of a duty ratio of the switching device 42. The DC-DC convertor 40 applies a predetermined DC voltage to the inverter 50 while the controller 70 controls switching device 42.

The inverter 50 has a bridge circuit composed of switching devices 51, 52, 53, 54. The inverter 50 converts the DC voltage output from the DC-DC converter 40 into an AC voltage while one pair of switching devices 51, 54 and the other pair of switching devices 52, 53 are alternately turned on and off. The same AC voltage is supplied to a lamp load L through a resonant circuit 60.

The resonant circuit 60 has an inductor 61 and a capacitor 62. The inductor 61 and the capacitor 62 are connected in series between one connection point where the switching device 51 and 52 are connected each other, and the other connection point where the switching device 53 and 54 are connected each other. The lamp load L is connected across the capacitor 62.

The controller 70 controls the inverter 50 such that the inverter 50 operates at a starting frequency, and a lighting frequency which is lower than the starting frequency. The starting frequency is corresponding to a resonant frequency of the resonant circuit 60. While the inverter 50 operates at the starting frequency, the resonant circuit 60 generates the high voltage pulse for turning on the discharge lamp. The inverter 50 operating at the lighting frequency outputs an electrical power having a sufficient magnitude which is capable of maintaining lighting the discharge lamp or the incandescent lamp.

Figure 2:
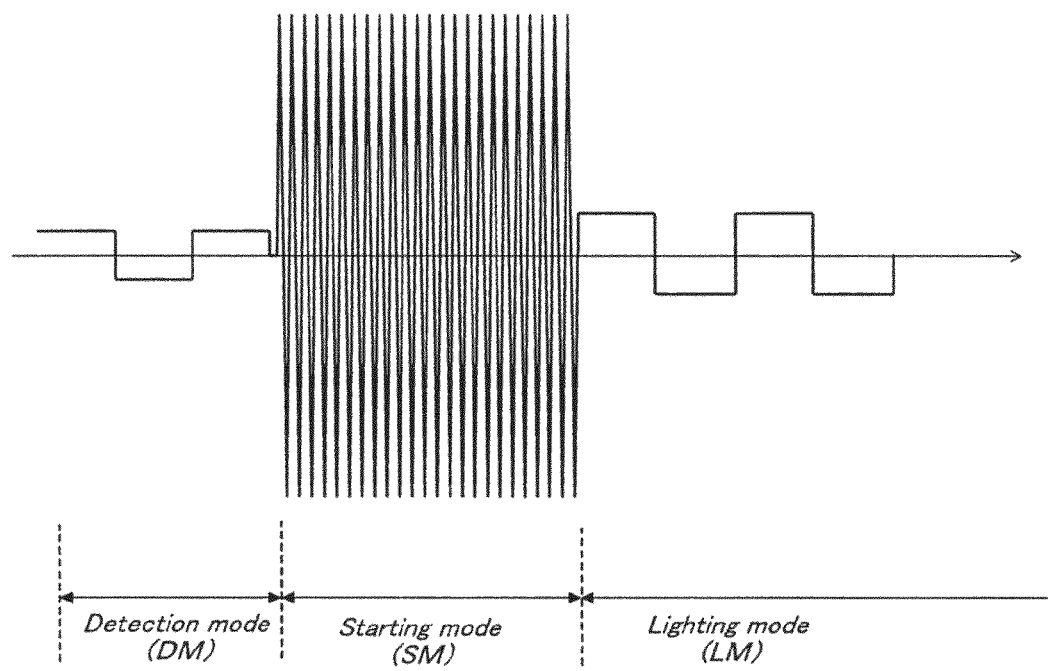
FIG. 2A is an operation waveform chart illustrating a voltage which the lamp ballast outputs while the discharge lamp is lit.
FIG. 2B is an operation waveform chart illustrating a voltage which the lamp ballast outputs while the incandescent lamp is lit.
Figure 2:
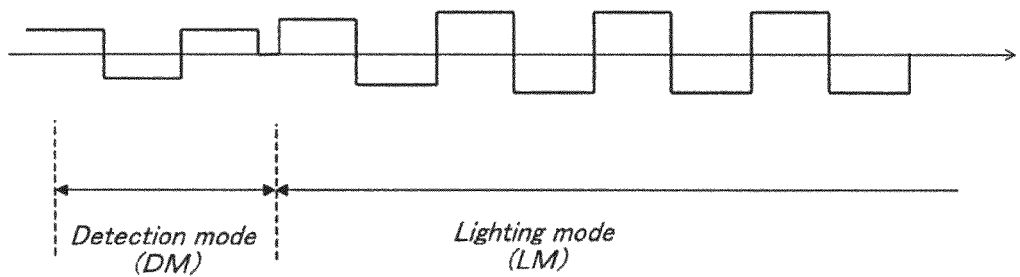

The controller 70 is configured to supply an optimum power on the basis of discrimination indicating whether the connected lamp load L is the discharge lamp or the incandescent lamp. When a result of the discrimination indicates a connection of the discharge lamp, the controller 70 executes a discharge lamp lighting program. As shown in FIG. 2A, in the discharge lamp lighting program, the controller 70 operates the inverter 50 in a starting mode (SM) and subsequently in a lighting mode (LM). In the starting mode, the controller 70 drives the inverter 50 at the starting frequency to apply the high voltage pulse to the lamp load L. In the lighting mode, the controller 70 drives the inverter 50 at the lighting frequency to output a low-frequency voltage from the inverter 50. When the resultant discrimination indicates that the incandescent lamp is connected, the controller 70 executes an incandescent lamp lighting program. As shown in FIG. 2B, in the incandescent lamp lighting program, the controller 70 operates the inverter 50 only in the lighting mode (LM) without operating the inverter 50 in the starting mode (SM).

As shown in FIG. 1, the lamp ballast of the present invention involves discriminating means 80 which discriminates types of the lamp load L connected to the lamp ballast. This discriminating means 80 includes a comparator 84 for comparing the output DC voltage of the DC-DC converter 40 with a predetermined threshold Vref. The comparator 84 compares the output DC voltage, divided by resistors 81, and 82, with the predetermined threshold Vref.

The controller 70 has a detection mode (DM) in which the controller 70, just after switching on a power source, decreases the duty ratio of the switching device 42 of the DC-DC converter 40 such that the DC voltage from the DC-DC converter 40 becomes a detection voltage being lower than a normal voltage used for lighting. In the detection mode, the discriminating means 80 identifies types of the lamp load L by a magnitude of an output voltage from the comparator 84. While the discharge lamp is connected, the detection voltage exceeds the threshold Vref because an electrical current hardly flows through the unlit discharge lamp. In this instance, the comparator 84 outputs a low-level detection signal. On the contrary, while the incandescent lamp is connected, the detection voltage falls below the threshold Vref because an electrical current can flow through the incandescent lamp whether the incandescent lamp is lit or unlit. In this instance, the comparator 84 outputs a high-level detection signal.

The controller 70 includes a lamp discriminator 72. The lamp discriminator 72 identifies the lamp load L as the discharge lamp, upon receiving the low-level detection signal in the detection mode. In this case, the controller 70 executes the discharge lamp lighting program, and controls the DC-DC converter 40 and the inverter 50 such that the discharge lamp lights and subsequently continues a stable lighting. On the other hand, upon receiving the high-level detection signal, the lamp discriminator 72 identifies the lamp load L as the incandescent lamp. In this instance the controller 70 runs the incandescent lamp lighting program.

The controller 70 has a frequency switching circuit 74 and a power regulator 75. When the lamp discriminator 72 judges the lamp load L as the discharge lamp, the frequency switching circuit 74 drives the inverter 50 at the starting frequency, and subsequently provides to each of the switching devices 51, 52, 53, 54 of the inverter 50 a control signal used for driving the inverter 50 at the lighting frequency. When the lamp discriminator 72 judges the lamp load L as the incandescent lamp, the frequency switching circuit 74 provides the control signal to the inverter 50 for driving the inverter 50 at the lighting frequency.

Figure 3:
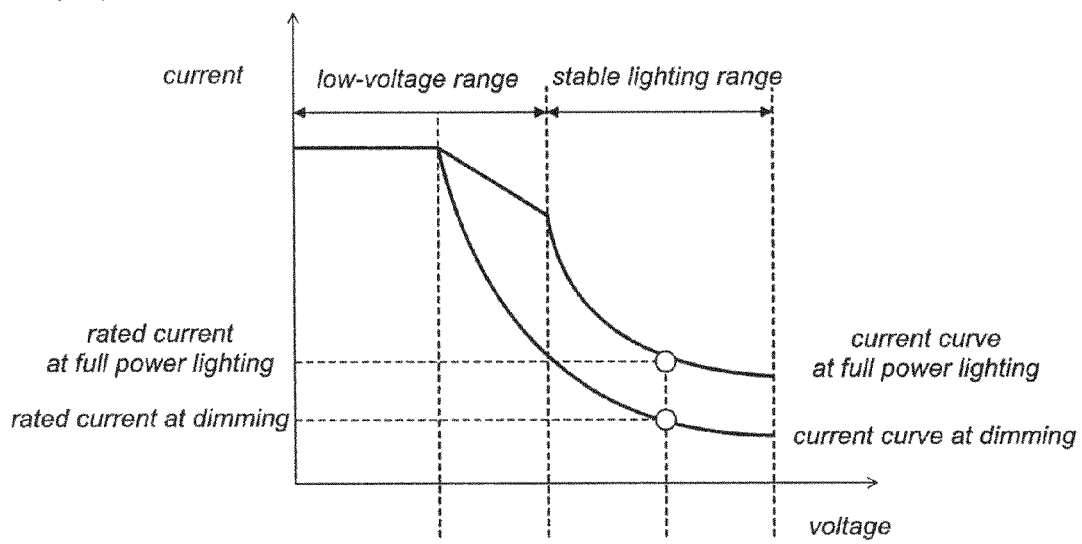
FIG. 3A is a graph chart illustrating a voltage-current characteristic curve defined by a current control table which the lamp ballast uses for lighting the discharge lamp.
FIG. 3B is a graph chart illustrating a voltage-power characteristic curve of the lamp ballast lighting the discharge lamp.
Figure 3:
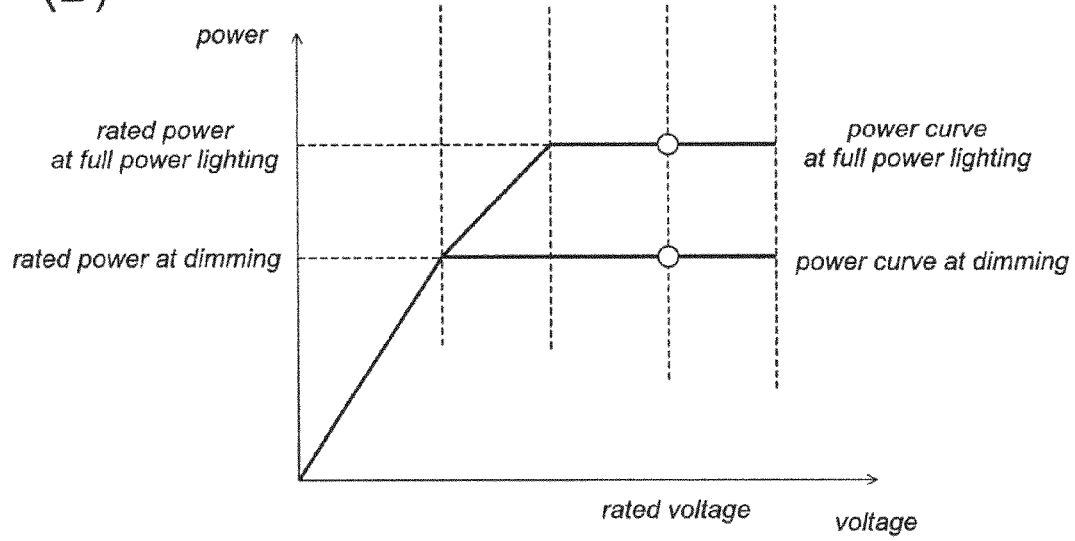
Figure 4:
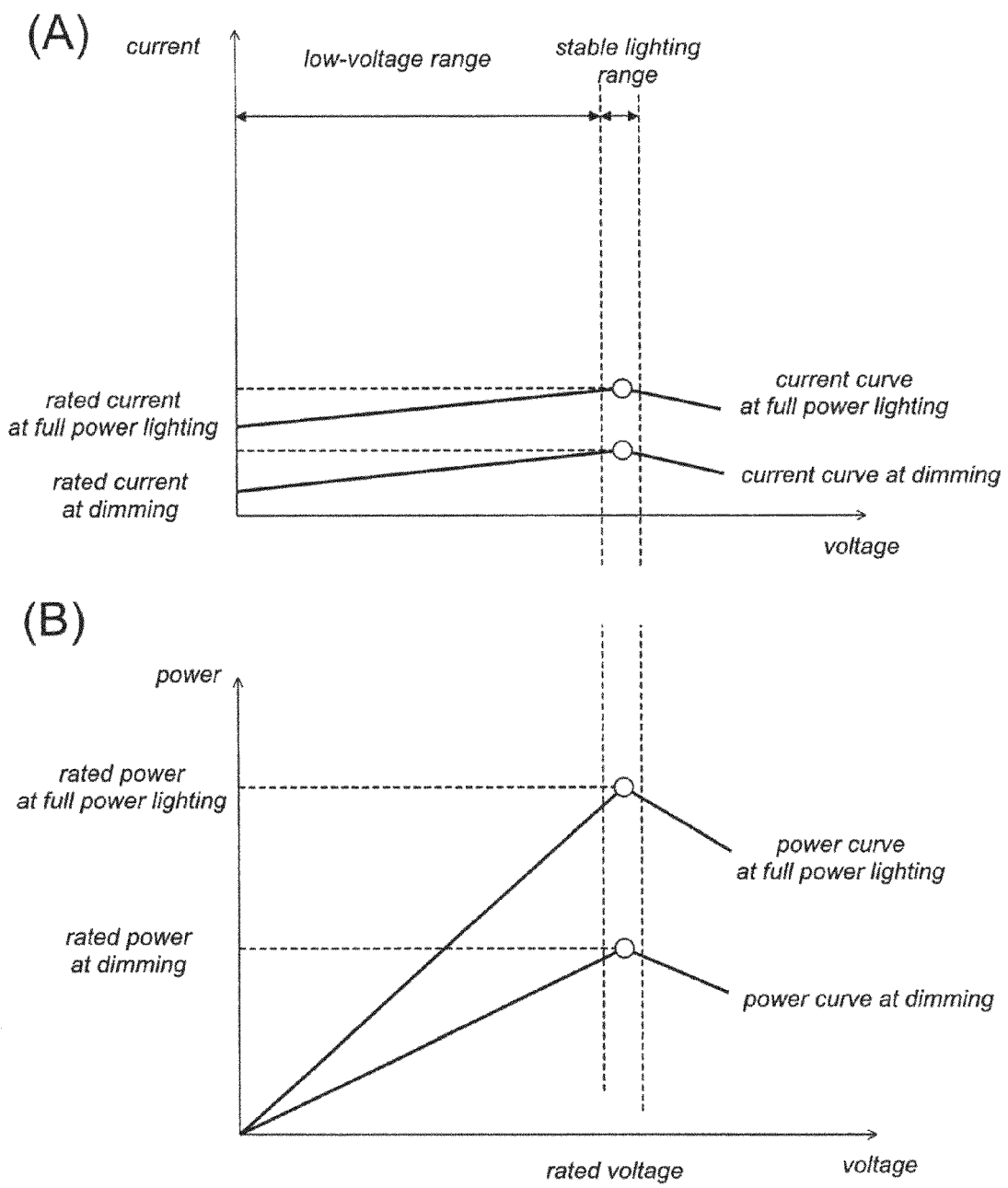
FIG. 4A is a graph chart illustrating a voltage-current characteristic curve defined by a current control table which the lamp ballast uses for lighting the incandescent lamp.
FIG. 4B is a graph chart illustrating a voltage-power characteristic curve of the lamp ballast lighting the incandescent lamp.

The power regulator 75 performs an electric power control in accordance with each characteristic of the discharge lamp and the incandescent lamp. The power regulator 75 controls the DC voltage output from the DC-DC converter 40 by use of a current control table 76 for the discharge lamp and a current control table 77 for the incandescent lamp, with monitoring a lamp voltage and a lamp current. The current control table 76 defines a characteristic curve showing a relation between the current and the voltage corresponding to the discharge lamp as shown in FIG. 3A. The current control table 77 defines a characteristic curve showing a relation between the current and the voltage corresponding to the incandescent lamp as shown in FIG. 4A. The power regulator 75 monitors the output DC voltage from the DC-DC converter 40 as the lamp voltage. The power regulator 75 monitors the lamp current by use of an electric current monitor 90 provided between the DC-DC converter 40 and the inverter 50. When the lamp discriminator 72 detects the connection of the discharge lamp, the current control table 76 is selected, and then the power regulator 75 controls the duty ratio of the switching device 42 of the DC-DC converter 40 in order to accomplish a voltage-current characteristic which is defined by the table 76. On the contrary, when the lamp discriminator 72 detects the connection of the incandescent lamp, the current control table 77 is selected, and then the power regulator 75 controls the duty ratio of the switching device 42 of the DC-DC converter 40 in order to accomplish a voltage-current characteristic which is defined by the table 77. Accordingly, as shown in FIG. 3B and FIG. 4B, the power regulator 75 performs an optimum power control corresponding to each of the discharge lamp and the incandescent lamp. As a result, a stable lighting of the lamp load L is maintained.

Besides, the controller 70 is configured to delimit the output current from the DC-DC converter 40 below a predetermined level during a certain initial period in the lighting mode in order to prevent an undue inrush current from flowing through the incandescent lamp when a connection of the incandescent lamp is discriminated.

Further, each of the current control table 76, 77 defines a characteristic curve of a voltage-current relation of the lamp ballast when dimming the lamp load L. Upon receiving an instruction of dimming the lamp load L, the controller 70 performs a power control depending on this characteristic curve.

The lamp ballast involving the above mentioned constitutions and functions is housed in an illumination apparatus having a proper designed appearance.

The invention claimed is:

1. A lamp ballast comprising:
 a DC-DC converter configured to convert a DC voltage into a variable DC voltage and output the same;
 an inverter configured to convert said DC voltage from the DC-DC converter at a varying frequency into an AC power, and providing said AC power to a lamp load;
 a starting circuit configured to receive said AC power to generate a high voltage pulse and provide it to said lamp load;
 a controller configured to control said DC-DC converter and said inverter to provide said variable DC voltage and said AC power of variable frequency; and
 a comparator configured to compare the DC voltage from said DC-DC converter with a predetermined threshold,
 wherein said controller has a starting mode of driving said inverter at a starting frequency to generate said high voltage pulse, and a lighting mode of driving the inverter at a frequency lower than said starting frequency,
 said controller having a detection mode of causing said DC-DC converter to provide a detection DC voltage prior to said starting mode, a discharge lamp lighting program of operating, after the detection mode, said inverter in said starting mode and subsequently in said lighting mode, and an incandescent lamp lighting program of operating, after the detection mode, said inverter in said lighting mode without through said starting mode,
 said comparator being configured to provide a first detection signal to said controller when said detection DC voltage exceeds said predetermined threshold, and provide a second detection signal when said detection DC voltage is lower than said predetermined threshold, and
 said controller being configured to select said discharge lamp lighting program in response to said first detection signal, and select said incandescent lamp lighting program in response to said second detection signal.

2. A lamp ballast as set forth in claim 1, wherein said inverter includes a resonant circuit configured to oscillate at said starting frequency for generating said high voltage pulse.

3. A lamp ballast as set forth in claim 1, wherein said controller is configured to monitor the current and the voltage output from said DC-DC converter, and has a first current control table defining a characteristic curve showing a relation between the current and the voltage output from said DC-DC converter, and a second current control table defining another characteristic curve different from that of the first current control table with regard to a relation between the current and the voltage output, and wherein said controller is configured to control the current output from said DC-DC converter on the basis of the first current control table upon selection of the discharge lamp lighting program, and to control the current output from said DC-DC converter on the basis of the second current control table upon selection of the incandescent lamp lighting program.

4. A lamp ballast as set forth in claim 1, wherein said controller is configured to delimit the output current from said DC-DC converter below a predetermined level during a certain initial period in said lighting mode when said incandescent lamp lighting program is selected.

5. An illumination apparatus having the lamp ballast as set forth in claim 1.

\* \* \* \* \*